April 11, 1961  F. A. SCHWERTZ  2,978,968
RECORDING APPARATUS AND METHOD
Filed April 14, 1958
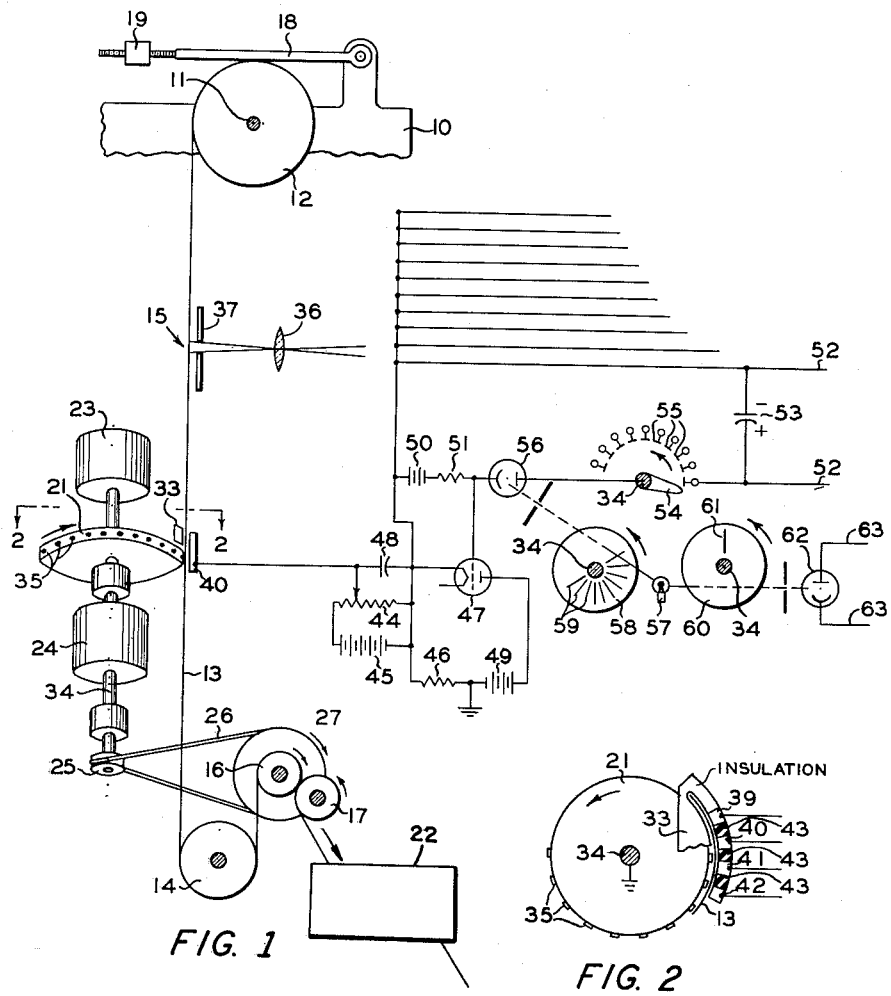
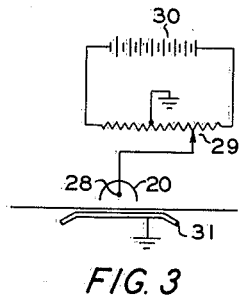
FIG. 3
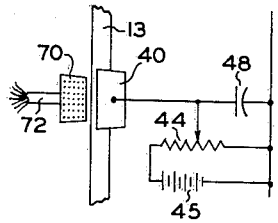
FIG. 4
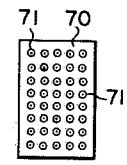
FIG. 5
INVENTOR.
Frederick A. Schwertz
BY
ATTORNEY

United States Patent Office 2,978,968
Patented Apr. 11, 1961

2,978,968

RECORDING APPARATUS AND METHOD

Frederick A. Schwertz, Pittsford, N.Y., assignor to Haloid Xerox Inc., a corporation of New York Filed Apr. 14, 1958, Ser. No. 728,138

4 Claims. (Cl. 95—1.1)

This invention relates in general to electric recording and in particular to the combination of photography together with electric recording.

This is a continuation-in-part of my co-pending application Ser. No. 623,327, filed November 20, 1956.

In the photographic arts it is frequently desirable to place digital information, identification, descriptiins or other inscribed data and information on photographic reproductions. For example, the increasinig complexity of applications of photography reproduction have been bringing about numerous occasions and applications in which it is desired to produce fast sequence photography, or strip or slit photographic recording, wherein additional information accompanying the photographic recording is required in the final product. In the past, it has been usual to accomplish these results by an initial photographic sequence of exposure, developing, and fixing followed by separate and subsequent addition of information, data, and the like, or alternatively by an extra optical operation.

An object of the present invention is to obviate subsequent addition of information, thus making it possible to record the additional information essentially simultaneously with recording of the optical or photographic information.

An additinal object of the invention is to provide apparatus for recording of photographic or optical information with recording of at least one kind of non-photographic or non-optical information onto a non-photographic sensitive layer.

Another object of the present invention is to provide apparatus for photographic recording and alphanumeric printing on a single photosensitive layer.

A further object is to provide apparatus for electronic recording from a coded signal onto a light sensitive photographic emulsion layer.

In carrying out the present invention a light sensitive photographic layer is exposed to an image of light and shadow to be recorded such as, for example, a document or the like, a 3-dimensional object or scene, an X-ray pattern, or other visual or radiant image, and a latent photographic image is imposed on the light sensitive photographic layer by silent invisible electric discharge from an adjacent shaped electrode, preferably corresponding to or simulating an alphanumeric character.

The general nature of the invention havinp been set forth, the invention wiil now be described illustratively in the following specification and claims wherein:

Fig. 1 is a diagrammatic view of apparatus according to one embodiment of the invention including means for photographic and digital electric recording Fig. 2 is a view of one portion of digital recording apparatus shown in Fig. 1;

Fig. 3 is precharging apparatus according to one embodiment of the invention;

Fig. 4 is a diagrammatic view of electric recording apparatus according to another embodiment ol the invention Fig. 5 is a view of a recording matrix according to Fig. 4.

In Figs. 1 and 2 is illustrated one form of apparatus suitable for the present invention. The recording device illustrated in the figure comprises a suitable frame-work 10 which may include a pair of supported vertical sideplate with structural support members mounted between the plates and the working parts of the device secured thereto. A spindle 11 at the top of the frame carries a supply roll 12 of photographic paper or film which is fed off the roll as a web 13 passes to the lower part of the machine where it passes around a guide roller 14 to a drive roller 16 and out between this drive roller 16 and an idling roller 17. A controlled tension may be applied to the web by a suitable slip clutch such as, for example, a sliding plate 18 resting on the top of the roll 12 and having variable pressure control means such as a movable leverage weight 19.

Positioned between the supply roll 12 and the drive roller 16 is a photographic recording station 15 and an electric image recording electrode 21 such as, for example, a character wheel as will be hereinafter described. Optionally positioned beneath or beyond the character wheel is cinventional photographic developing and/or fixing apparatus 22 such as, for example, rapid fixing, developing and washing baths together with suitable guide means to carry the web therethrough. If desired, the developing and fixing mechanism may be omitted and the exposed and electrostatically printed film passed directly to a take-up roll (not shown) for subsequent processing.

Drive mechanism is activated by a motor 23 having a shaft 34 on which is mounted the character wheel 21. Preferably the motor 23 is energized to run at an accurately predetermined speed by means of a uniform speed control synchronized with the input signal. Alternatively the speed of operation of the motor or other drive control mechanism may be synchronized in other than uniform motion, progressively advancing the web in response to an external coded electrical signal, as for example, by stepwise motion.

Also mounted on the drive shaft 34 is a set of commutators and photoelectric timers located in housing 24, and a drive pulley 25 which drives the drive roller 16 through belt 26 and pulley 27 at a speed synchronized to the rotation of the character wheel 21. In this manner, roller 16 advances the web 13 one space along its path for each rotation of wheel 21.

After leaving the supply roll 12 the web passes downward through a photographic focal plane formed, for example, by lens 36 and exposure slit or frame 37. Desirably flow type slit exposure is employed.

Next the web is moved between the character wheel 21 and at least one reference electrode 40 and preferably a series of side-byside electrodes such as electrodes 39, 40, 41 and 42 of Fig. 2, positioned extremely closely adjacent to the character wheel. The reference electrode is preferably curved to the radius of the character wheel and is spaced from the character wheel by a distance only minutely greater than the thickness of the web 13. In passing between the character wheel and the reference electrode the web is curved or drawn into a substantially cylindrical shape by an insulating circular segment plate 33 disposed just above and parallel to the wheel 21 and shaped and positioned to press the web against the reference electrode 40 as it passes thereacross. Optionally, the assembly on shaft 34 is tipped slightly from a vertical position so that the character wheel rotates slightly out of the horizontal so as to permit progression of the web during printing without moving the printed information out of alignment.

Character wheel 21 may be an electrically conductive material such as a metal disc or the like having a cylindrical edge whose thickness is roughly the desired height of one character to be printed. A series of raised metal character faces 35 resembling type faces may be mounted on the edge of the disc at spaced intervals around part or all of the periphery thereof, and at least these character faces and connecting leads to the faces are electrically conductive. For example, the numbers 0 through 9 can be spaced around a portion of the circumference and alphabetical characters spaced around the rest of the periphery. Other characters as desired for special printing purposes may be employed. The face of such characters should be accurately machined or otherwise accurately located at a uniform radius from the center of rotation of the disc preferably within a fine tolerance in the order of about .0001 of an inch. The rotation of the character wheel or disc should be essentially vibrationless and as much as possible the distance from the character face to the web 13 and from the character face to the reference electrode 40 should be maintained at a uniform constant distance throughout operation of the machine. It has been found that satisfactory operation requires a spacing between the character face and the web of at least about 2 microns and up to about 100 microns. Best results are achieved with a spacing in the order of about 20 microns and preferably between about 10 and 30 microns.

Electrically formed latent images are applied by characters 35 on character wheel 21 by producing an intense electric field of short duration between the character and the reference electrode 40 at the instant the character on wheel 21 comes opposite the electrode of the desired column for printing. Generally pulses of at least several hundred volts are employed, usually between about 700 volts and about 2,000 volts. Fig. 1 illustrates a circuit which may be used for applying recording potentials in response to a coded electric signal received from a suitable signal source such as a digital computer, a manual key board, or magnetically recorded electric impulses or signals or the like. According to this figure, a plurality of separate electrodes 40 are spaced around a portion of the character wheel 21 to represent a plurality of printing columns for recording information on the web 13. A pulsing circuit is illustrated in Fig. 1 wherein electrode 40 is connected to an adjustable tap of potentiometer 44 bridged across battery 45, one terminal of which is grounded through resistance 46. By moving the potentiometer tap the positive potential applied to electrode 40 can be adjusted to produce an electric field between the character faces and the web which is just below the threshold potential at which discharge can start. A triode 47 has its cathode connected to resistance 46 and to electrode 40 through capacitor 48. The anode is connected through plate supply battery 49 to ground, so that when triode 47 is conducting the potential of battery 49 is applied across resistance 46 to add this potential drop to the fixed potential applied to electrode 40 by battery 45. This raises the potential of electrode 40 above the threshold so that discharge takes place from any character which is opposite electrode 40 at the instant the tube becomes conducting. As electronic or ionic charges are deposited on the surface of web 13 by the discharge the electrostatic charge image built up on the web reduces the electric field and lowers the rate of discharge until it is stopped completely when the electrostatic image is fully formed. The anode current in triode 47 is allowed to flow for only a short interval so that the motion of the wheel 21 is insufficient to cause blurring during the period of a recording pulse.

The grid of triode 47 is biased to cut-off potential by battery 50 through resistor 51. An impulse circuit 52 leading from an information storage circuit of a digital computer, or other source of signals, is provided corresponding to each character face 35 on wheel 21 for each electrode 40. One such circuit, corresponding to the numeral "1" on the wheel, is shown. The circuit terminates in a capacitor 53 which is charged at the beginning of each cycle of rotation of wheel 21 when the numeral "1" is to be recorded in the column of electrode 40, and remains uncharged if numeral "1" is not to be recorded. If another numeral is to be recorded a similar capacitor in another of the circuits 52 will be charged, but only one capacitor is charged for each electrode in any given cycle.

A commutator arm 54 mounted on shaft 34 rotates with wheel 21 and makes contact in sequence with contacts 55 in which one side of the circuits 52 terminate. Arm 54 closes each contact as the character on the wheel 21 corresponding to the circuit 52 of that contact comes opposite electrode 40. The grid of triode 47 is connected to arm 54 through photocell 56 so that a capacitor 53 will be connected in parallel with the grid bias circuit whenever the photocell becomes conducting with commutator arm 54 on one of contacts 55. Photocell 56 is energized by a light beam from lamp 57 under control of a rotating disc 58 also mounted on shaft 34 and provided with a series of light transmitting slits 59 which allow light to reach the photocell at the instant each character is properly centered opposite the electrode, such as 40, associated with the circuit. If the connected capacitor 53 carries a charge a positive pulse is thereby applied to the grid making the triode conducting for the short interval required to deposit an image on the web, the circuit constants being adjusted to restore the triode to the non-conducting state before blurring can take place due to motion of the wheel, as previously described. If wheel 21 is rotated at one thousand r.p.m. or greater the time of the recording pulse may be only a few micro-seconds.

A second rotating disc 60 provided with a single light slot 61 controls a second photocell 62 in a reset control circuit 63. Slot 61 passes a light pulse to photocell 62 immediately after commutator arm 54 has completed a traversal of the series of contacts 55 to initiate the transfer of a new set of charging pulses over circuits 52 to set up the charges on selected capacitors 53 as determined by the computer output, electronic storage circuits or other information or signal sources. The charges on capacitors 53 are therefore reset during the period when the blank portion of the wheel 21 is passing in front of the web and the web is continuing its downward motion to provide the between-line spacing.

According to one embodiment of the invention the photographic web 13 may be precharged prior to the electric recording device, and preferably at a position intermediate between the supply roll 12 and the exposure frame 37. In Fig. 3 is shown suitable precharging apparatus including a conductive shoe 31, preferably grounded, and an opposed corona charging electrode including, for example, one or more fine, high voltage, corona discharge wires 28 within a shield 20. The corona wires are energized at a potential of several thousand volts, generally about 6000 to 10,000 volts optionally by means of a high voltage source 30 operating through a potentiometer 29 or similar voltage control device. The precharging device serves to apply an initial charge to assist in rapid sequence pulsing, to apply a precharge for electrophotographic recording or, desirably, to assist in conventional photographic handling and exposure.

In use and operation the apparatus is supplied with a strip or belt of a recording member 13 such as, for example, a roll of photographic film, photographic paper, or the like. The strip of film or paper is exposed to a suitable optical image such as, for example, the face of a cathode ray tube or other source of information to be recorded by means of lens 36 operating through an exposure frame 37 as described. Alternatively, the film may be exposed in a strip camera such as, for example, an aerial strip camera, to a moving 3-dimensional scene or, if desired, in a microfilm enlarger or recorder for the recording or enlarging of microfilm or the like. Alternatively, the apparatus may be employed for frame-by-frame exposure.

It has been found desirable according to the present invention to employ photographic film or at least photographic paper having a relatively fast photographic emulsion such as, for example, a bromide enlarging paper or a high-speed paper for direct camera recording. It has been found advisable when employing a photographic paper to maintain relatively humid ambient atmospheric conditions such as, for example, a relative humidity above about 50% or alternatively to employ some means of moistening the backing support of the paper. At lower humidities or in the absence of additional moisture it has been found important to maintain relatively close contact between the photographic paper or film and the reference or backing electrode 40.

The present invention is adaptable for high-speed recording of inscribed data in combination with photographic recording on many types of conventional photographic sensitive layers. Where it is intended to employ subsequent photographic processing as in the case of ordinary photographic film and enlarging paper or the like, it has been found that a latent image can be electrostatically established in the photosensitive layer at pulsed times in the order of one or several microseconds. Specifically, pulse times in the order of 1 or 2 microseconds have been achieved with bromide enlarging paper. In particular, according to preferred embodiments of the invention, the pulsing circuits are limited to pulse times less than 10 microseconds and preferably about 2 microseconds or less in order to stop the motion of rapidly moving electrodes or character faces. In co-pending application Ser. No. 623,327 there has been disclosed pulsing apparatus and circuits capable of printing high speed character information at character presentation rates as high as many thousands of characters per second. It is specifically intended that pulsing combinations and apparatus such as disclosed in that application may be combined with full frame or slit exposure optical systems as illustrated in Fig. 1 herein. Such combined apparatus is suitable for recording on photographic film or photographic paper combined with development in the apparatus or storage for subsequent development.

Where immediate visual image formation is desired it has been found that suitable images can be produced at satisfactory exposure speeds with printout paper and that alphanumeric character informatiton can be added with pulse or current times in the order of a fraction of a second up to one or two seconds. Images of entire characters have been produced in satisfactory quality with pulse or current times of 1 second to form immediately visible images on such print-out paper. Xerographically developable electrostatic images have been produced on photoconductive insulating layers such as amorphous selenium or photoconductor pigments such as zinc oxide or the like in insulating resin binders with pulse times substantially equivalent to instantaneous discharge of a capacitor equal to pulse times of about 1 microsecond.

It is presently preferred to employ an electrical pulse applied to a shaped character face such as, for example, a raised conductive surface shaped in alphanumeric character configuration so as to utilize simplified circuitry systems. Functionally comparable results can be achieved, however, through employment of a matrix of conductive points or electrodes selectively energizable to simulate alphanumeric configuration or with a line of selectively energizable conductor points selectively energizable in conjunction with synchronized control of the progressively advanced path of web 13. Illustrated in Figs. 4 and 5 is such an image forming device including a 5 x 7 point matrix generally designated 70 including an array of separately energized needles or conductive wire points 71. The photographic web 13 is adapted to be passed between a reference electrode 40 and this matrix 70, while a suitable pulse is imposed through multistrand conductor 72 on the selective needles 71 with respect to the reference electrode 40, to produce a series of electric discharge dots to the surface of the photosensitive web 13. The multistrand conductor is connected to suitable electric amplifying and gating circuits operated from an input signal source to energize the matrix 70 in character configuration in response to said signal. The matrix 70 thereby is adapted to replace the character wheel 21 in the apparatus disclosed in Fig. 1. Alternatively, the conductive wire points 71 may be selectively energized synchronously with progressive motion of web 13 to record analog information as well as digital information.

What is claimed is:

1. Information recording apparatus comprising movable support means for a recording member bearing a light sensitive photographic layer, means to expose said layer to an image of light and shadow to be recorded, an input for a coded electrical signal corresponding to alphanumeric information to be recorded and means to convert said signal to a timed electric pulse, at least one reference electrode and means to advance the recording member against said electrode, an adjacent energizable rotatable character wheel bearing on a peripheral surface a plurality of conductive alphanumeric character faces disposed adjacent to said reference electrode and positioned to receive the recording member between said character wheel and said reference electrode and timed means to pulse said character faces in response to the input signal with a pulse having a pulse duration less than 10 microseconds and of short ending duration to produce a sharp image on the photographic layer, and uniform speed drive means to advance the recording member progressively between the reference electrode and the character wheel, said drive means being timed synchronously with the timed electric pulse to position the recording member with respect to the character wheel at the instant of pulse, whereby a latent image is formed of alphanumeric information combined with optical information.

2. Information recording process comprising moving a recording member bearing a light sensitive photographic layer through an optical exposure station, exposing said layer to an optical image at said optical exposure station in timed relation to the movement of said member, advancing said member through an electrostatic image recording station comprising an electrode array and a reference electrode positioned closely spaced from each other on opposite sides of said member, converting intelligence to be recorded into a sequence of electric pulses timed in relation to the movement of said member, applying said pulses to said array causing an invisible electrostatic discharge between said array and said reference electrode there-opposite creating an electrostatically formed latent image of said intelligence on said member in predetermined relation to said optical image, and contacting said layer with a photographic developer solution whereby both said optical image and said intelligence are rendered visible without further processing.

3. Information recording process comprising moving a recording member bearing a light sensitive photographic layer through an optical exposure station, exposing said layer to an optical image at said optical exposure station in timed relation to the movement of said member, advancing said member through an electrostatic image recording station comprising an array of pin electrodes and a reference electrode positioned closely spaced from each other on opposite sides of said member, converting intelligence to be recorded into a sequence of electric pulses timed in relation to the movement of said member, applying said pulses to selected pins of said array causing an invisible electrostatic discharge between said array and said reference electrode there-opposite, creating an electrostatically formed latent image of said intelligence on said member in predetermined relation to said optical image, said image being composed of minute relatively well defined dots which in combination reproduce the intelligence to be recorded and contacting said layer with a photographic developer solution whereby both said optical image and said intelligence are rendered visible without further processing.

4. Information recording process comprising moving a recording member bearing a light sensitive photographic layer through an optical exposure station, exposing said layer to an optical image at said optical exposure station in timed relation to the movement of said member, advancing said member through an electrostatic image recording station comprising a rotatable character wheel bearing on a peripheral surface a plurality of conductive alphanumeric character faces and a reference electrode positioned closely spaced from said wheel on opposite sides of said member, rotating said wheel at a constant angular velocity, converting intelligence to be recorded into a sequence of electric pulses timed in relation to the movement of said member and of said wheel so that said pulses are applied between said wheel and said reference electrode when the alphanumeric character corresponding to said intelligence is adjacent the reference electrode creating an electrostatically formed latent image of said intelligence on said member in predetermined relation to said optical image and contacting said layer with a photographic developer solution whereby both said optical image and said intelligence are rendered visible without further processing.

References Cited in the file of this patent

UNITED STATES PATENTS

| | | |
|---|---|---|
| 2,178,989 | Conrad | Nov. 7, 1939 |
| 2,716,826 | Huebner | Sept. 6, 1955 |
| 2,819,942 | Goodling | Jan. 14, 1958 |